US008979133B2

(12) United States Patent
Vidler et al.

(10) Patent No.: US 8,979,133 B2

(45) Date of Patent: Mar. 17, 2015

(54) DATA CARRIER FOR HEALTH RELATED INFORMATION

(75) Inventors: Bryan W. Vidler, Ridgeville, OH (US); Frank Lombardo, Clarence Center, NY (US); Bryce C. Waggoner, Monroe, OH (US); Gary M. Cairns, Tipp City, OH (US)

(73) Assignee: The Standard Register Company, Dayton, OH (US)

( * ) Notice: Subject to any disclaimer, the term of this patent is extended or adjusted under 35 U.S.C. 154(b) by 877 days.

(21) Appl. No.: 12/797,090

(22) Filed: Jun. 9, 2010

(65) Prior Publication Data

US 2010/0237605 A1 Sep. 23, 2010

Related U.S. Application Data

(62) Division of application No. 10/822,386, filed on Apr. 12, 2004, now Pat. No. 7,758,080.

(51) Int. Cl.

| | |
|---|---|
| ***B42D 15/00*** | (2006.01) |
| ***B42D 15/10*** | (2006.01) |
| ***G09C 3/00*** | (2006.01) |

(52) U.S. Cl.

CPC ............... *B42D 15/00* (2013.01); *Y10S 283/90* (2013.01); *Y10S 283/901* (2013.01)

USPC .................. 283/98; 283/67; 283/70; 283/72; 283/74; 283/75; 283/81; 283/94; 283/100; 283/101; 283/103; 283/105; 283/900; 283/901

(58) Field of Classification Search

USPC ............ 281/5, 51; 283/67, 70, 72, 74, 75, 79, 283/81, 94, 98, 100, 101, 103, 105, 117, 283/900, 901

See application file for complete search history.

(56) References Cited

U.S. PATENT DOCUMENTS

| | | | |
|---|---|---|---|
| 3,524,271 | A | 8/1970 | Buske |
| 3,822,492 | A | 7/1974 | Crawley |

(Continued)

FOREIGN PATENT DOCUMENTS

| | | |
|---|---|---|
| JP | 03289465 A | 12/1991 |

OTHER PUBLICATIONS

Restriction Requirement pertaining to U.S. Appl. No. 10/822,386 dated Nov. 3, 2006.

(Continued)

*Primary Examiner* — Monica Carter

*Assistant Examiner* — Justin V Lewis

(74) *Attorney, Agent, or Firm* — Dinsmore & Shohl LLP

(57) ABSTRACT

A data carrier provides health related information regarding a patient, and facilitates compliance with HIPAA by the obscuring the association between the name of the patient and the health related information when the data carrier is to be discarded. The data carrier includes a release liner, a health information label having an upper surface and a lower surface, the label including a first area on the upper surface for indicia specifying health related information and a second area on the upper surface for indicia specifying the identity of a patient, and a pressure sensitive adhesive coating on the lower surface of the health information label, securing the health information label to the release liner. A masking label is either integral with the health information label, or the liner. By various arrangements the masking label is either removed from the health information label, thereby disassociating the patient identity and the health related information, or the masking label is secured to the health information label so as to cover and obscure the name of the patient or the information, or both.

2 Claims, 4 Drawing Sheets

(56) References Cited

U.S. PATENT DOCUMENTS

| | | | |
|---|---|---|---|
| 3,900,219 | A | 8/1975 | D'Amato et al. |
| RE30,958 | E | 6/1982 | White |
| 4,549,750 | A | 10/1985 | Stone et al. |
| 4,700,976 | A | 10/1987 | Loose |
| 5,013,088 | A | 5/1991 | Marin |
| 5,449,201 | A | 9/1995 | Miller et al. |
| 5,484,168 | A | 1/1996 | Chigot |
| 5,752,722 | A | 5/1998 | Moore et al. |
| 5,800,893 | A | 9/1998 | Harden |
| 5,874,142 | A | 2/1999 | Hoffmann |
| 5,895,075 | A | 4/1999 | Edwards |
| 5,900,610 | A | 5/1999 | Kelly, Jr. |
| 5,924,561 | A | 7/1999 | Baumgartner et al. |
| 5,958,536 | A | 9/1999 | Gelsinger et al. |
| 6,761,791 | B2 | 7/2004 | Arway et al. |
| 7,048,308 | B2 * | 5/2006 | Blank ............................ 283/81 |
| 2004/0007557 | A1 | 1/2004 | Maliszewski et al. |
| 2005/0196573 | A1 | 9/2005 | Myers et al. |

OTHER PUBLICATIONS

Office Action pertaining to U.S. Appl. No. 10/822,386 dated Apr. 18, 2007.
Office Action pertaining to U.S. Appl. No. 10/822,386 dated Oct. 15, 2007.
Advisory Action pertaining to U.S. Appl. No. 10/822,386 dated Jan. 30, 2008.
Answer to Appeal Brief pertaining to U.S. Appl. No. 10/822,386 dated Jul. 10, 2008.
Appeal Decision pertaining to U.S. Appl. No. 10/822,386 dated Dec. 22, 2009.
Notice of Allowance pertaining to U.S. Appl. No. 10/822,386 dated Mar. 9, 2010.

* cited by examiner

DATA CARRIER FOR HEALTH RELATED INFORMATION

CROSS-REFERENCE TO RELATED APPLICATIONS

This application is a divisional of U.S. patent application Ser. No. 10/822,386 filed Apr. 12, 2004 now U.S. Pat. No. 7,758,080.

STATEMENT REGARDING FEDERALLY SPONSORED RESEARCH OR DEVELOPMENT

Not applicable.

BACKGROUND OF THE INVENTION

The Health Insurance Portability and Accountability Act of 1996 (HIPAA) Privacy Rule created national standards to protect individuals' medical records and other personal health information. It protects all individually identifiable health information that is held or transmitted by a covered entity or its business associate, in any form or media, whether electronic, paper or oral.

It is considered important to minimize even the incidental disclosure of patient information to the extent possible. Health care providers have adopted a number of changes in their standard operating procedures to limit the incidental disclosure of patient health information beyond what is required to provide medical services to the patient in an effective and efficient manner. For example, most health care facilities take steps to make sure patient information is not retrievable by unauthorized individuals from discarded documents, records, and other materials containing identifiable patient information. Many organizations now require that such materials be shredded or incinerated to avoid the risk of disclosure. These materials may include empty plastic pill vials, discarded patient ID bracelets, and used plastic bags having patient labels. This requires that bins for collecting these materials be located through the facility, and that employees spend time to empty the bins and shred or burn the contents. As an alternative, some organizations mark through the name of the patient with a marking pen at the time that the material is discarded. This is also time consuming and may not be completely effective in rendering the name of the patient illegible.

It is seen, therefore, that there is a need for a data carrier for providing health information related to a patient in which the health information and the identity of the patient can be simply and efficiently disassociated.

SUMMARY OF THE INVENTION

These needs are met by a data carrier for providing health related information regarding a patient, and for facilitating compliance with HIPAA by the obscuring the association between the name of the patient and the health related information when the data carrier is to be discarded. The data carrier comprises a release liner, a health information label having an upper surface and a lower surface, and a pressure sensitive adhesive coating on the lower surface of the health information label, securing the health information label to the release liner. The health information label includes a first area on the upper surface for indicia specifying health related information and a second area on the upper surface for indicia specifying the identity of a patient. A masking label is integral with the health information label. The masking label has blockout indicia printed thereon. A die cut is provided in the release liner, defining a removable liner piece beneath the masking label. The removable liner piece is removable from the release liner along with the health information label, and remains thereon when the health information label is applied to a surface. The removable liner piece permits the removal of the masking label from the health information label. The masking label is applied over one or both of the first and second areas to obscure the association between the name of the patient and the health related information when the data carrier is to be discarded.

The first and second areas are on a first portion of the health information label. The masking label is on a second portion of the health information label. The first and second portions are separated by a line of die cut perforations. The first and second portions of the health information label may be substantially equal in size and shape, in which case the masking label encompasses substantially all of the second portion. The removable liner piece beneath the masking label may be larger than the masking label.

The pressure sensitive adhesive coating on the lower surface of the label may comprise a permanent adhesive. Applying the masking label over one or both of the first and second areas obscures the association between the name of the patient and the patient's health related information when the data carrier is to be discarded. This may occur, for example, when the health information label has been placed on a prescription medicine container, and the container is being discarded. The health information label may define a plurality of scores or cuts, so that an attempt to remove the masking label from the upper surface of the health information label will result in the destruction of the health information label, rendering the identity of the patient or the health information, or both, unreadable.

The masking label may be smaller than the removable liner piece beneath the masking label. With this arrangement, the removable liner piece may extend beyond the edge of the health information label such that the removable liner piece can be used to remove the masking label.

The data carrier may include a release liner, a health information label having an upper surface and a lower surface, and a pressure sensitive adhesive coating on a portion of the lower surface of the health information label, securing the health information label to the release liner. The health information label may include a first area on its upper surface for indicia specifying health related information and a second area on its upper surface for indicia specifying the identity of a patient. The lower surface of the health information label beneath one or both of the first areas on the upper surface may be substantially free of pressure sensitive adhesive. A second label, integral with the health information label, is defined by a perforation line enclosing the part of the information label that is substantially free of pressure sensitive adhesive. The lower surface of the health information label beneath one or both of the first areas on the upper surface is substantially free of pressure sensitive adhesive such that the removal of the second label from the health information label obscures the association between the name of the patient and the health related information when the data carrier is to be discarded. The pressure sensitive adhesive coating on the lower surface of the label may comprise a permanent adhesive.

A data carrier may comprise a release liner, a health information label having an upper surface and a lower surface, and a pressure sensitive adhesive coating on the lower surface of the health information label, securing the health information label to the release liner. The health information label includes a first area on the upper surface for indicia specifying health related information, and a second area on the upper surface for indicia specifying the identity of a patient. A second label, integral with the health information label, is defined by a perforation line enclosing at least a portion of one of the first and second areas. A die cut in the release liner defining a removable liner piece beneath the second label. The removable liner piece is removable from the release liner with the health information label and remains thereon when the health information label is applied to a surface. The removable liner piece permits the subsequent removal of the second label from the health information label after the health information is applied to a surface. By this arrangement, the removal of the second label from the health information label obscures the association between the name of the patient and the health related information.

The second label may be smaller than the removable liner piece beneath the second label. The removable liner piece extends beyond the edge of the health information label such that the removable liner piece may be used to remove the second label.

A data carrier may comprise a release liner, a health information label having an upper surface and a lower surface, a pressure sensitive adhesive coating on a portion of the lower surface of the health information label, securing the health information label to the release liner, and a release coating on the balance of the lower surface of the health information label. The health information label includes a first area on the upper surface for indicia specifying health related information and a second area on the upper surface for indicia specifying the identity of a patient. The carrier further includes a masking label having blockout indicia printed thereon. The masking label carries a pressure sensitive coating, is integral with the release liner, and is positioned in alignment with the release coating on the balance of the lower surface of the health information label. A die cut in the health information label defines a removable label piece surrounding the release coating on the lower surface of the health information label. The removable label piece is removable with the health information label from the release liner, and remains therewith when the health information label is applied to a surface. The masking label is removable so that it can be applied over one or both of the first and second areas to obscure the association between the name of the patient and the health related information when the data carrier is to be discarded. The masking label may be defined by a die cut in the release liner.

Accordingly, it is an object of the present invention to provide a data carrier for providing health related information regarding a patient, and for facilitating compliance with HIPAA by obscuring the association between the name of the patient and the health related information when the data carrier is to be discarded. This and other objects will be apparent from the description and claims which follow.

DETAIL DESCRIPTION OF THE PREFERRED EMBODIMENTS

Figure 1:
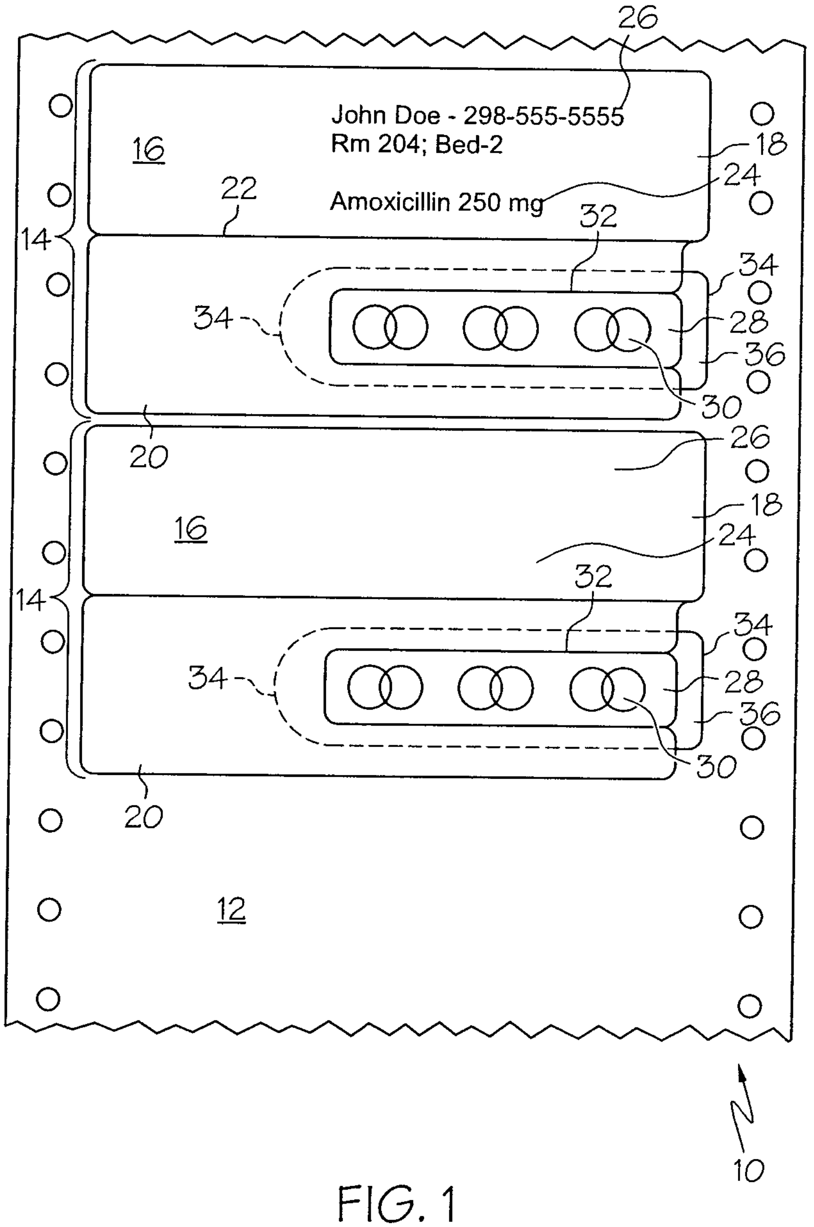
FIG. 1 is a plan view of a first embodiment of the present invention.

Reference is made to FIG. 1 which illustrates a data carrier 10 according to the present invention for providing health related information regarding a patient, and for facilitating compliance with HIPAA. As explained more fully, below, the data carrier is configured to permit the association between the name of the patient ("John Doe" in the example) and the health related information ("Amoxicillin 250 mg" in the example) to be obscured when the data carrier is to be discarded. The data carrier includes a release liner 12, a health information label 14 having an upper surface 16 and a lower surface, and a pressure sensitive adhesive coating on the lower surface of the health information label 14, securing the health information label to the release liner 12. The health information label 14 is made up of a first portion 18 and a second portion 20, with the first and second portions being separated by a line 22 of die cut perforations 22. Alternatively, die cut line 22 may be a continuous die cut. The label 14 includes a first area 24 on the upper surface 16 for indicia specifying health related information, such as an identification of medication, and a second area 26 on the upper surface 16 for indicia specifying the identity of a patient.

A masking label 28 having Tamper resistant die cuts 30 therein and further including blockout indicia (not shown) is integral with the health information label 14. The blockout indicia may be printed on either the upper or lower surface of the label and may take any of a number of known forms to make it more difficult to read printed information beneath the label 28 on a surface to which the label 28 is applied. The label 28 is defined by a die cut 32 in portion 20 of label 14. The die cut 32 can be a continuous die cut or, alternatively, a line of perforations. Beneath the masking label 28 is a die cut 34 in the release liner defining a removable liner piece 36. Die cut 34 may also be a continuous die cut or, alternatively, a line of perforations. As depicted in FIG. 1, the release liner 12 is a continuous liner, of the type upon which multiple labels may be positioned for printing and subsequent application to pharmaceutical containers.

The removable liner piece 36 can be removed from the release liner with the health information label 14 and remains thereon when the health information label 14 is applied to a surface, such as the outer surface of a pharmaceutical container. When applied in this manner, the liner piece 36 remains between the label 14 and the container surface and is surrounded on three sides by adhesive that secures the lower surface of the label 14 to the container surface. When the container is emptied and about to be discarded, the masking label 28 is removed from the liner piece 36 so that the masking label 28 can be applied over one or both of the first and second areas 24 and 26 to obscure the association between the name of the patient and the health related information.

The pressure sensitive adhesive coating on the lower surface of the label 14 may comprise a permanent adhesive. By this arrangement, applying the masking label 28 over one or both of the first and second areas 24 and 26 to obscure the association between the name of the patient and the health related information when the data carrier is to be discarded obscures the association between the name of the patient and the health related information. Because the adhesive is permanent, an attempt to remove the masking label 28 from the health information label 14 will result in the destruction of the label 14 to a degree needed to render the covered information illegible. To make it more difficult for a masking label 28 to be removed from the upper surface of the health information label 14, the health information label 14 may define a plurality of scores or cuts 30. These scores or cuts 30 make the label 14 somewhat fragile, so that an attempt to remove the masking label 28 from the upper surface 16 of the health information label 14 will result in the destruction of the health information label 14, rendering the identity of the patient or the health information, or both, unreadable.

As shown in FIG. 1, the masking label 28 may be significantly smaller than either of the portions 18 and 20. Further, the masking label 28 may be smaller than the removable liner piece 36 beneath the masking label 28. With the configuration illustrated, the removable liner piece 36 will extend beyond the edge of the health information label 14 when the label 14 has been removed from line 12 and applied to a container surface. As a consequence, the removable liner piece 36 may be easily grasped and used to remove the masking label from the container surface. The masking label 28 may then be removed from the liner piece 36 and applied over the name of the patient, thereby disassociating the identity of the patient and the medication prescribed and administered to the patient.

Figure 2:
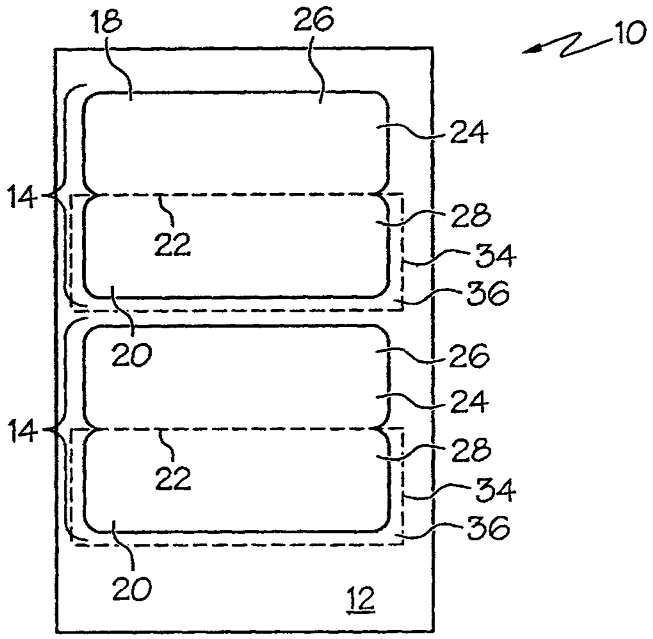
FIG. 2 is a plan view of a second embodiment of the present invention.

Reference is made to FIG. 2, which shows a second embodiment of the invention, with elements that correspond to those of the embodiment of FIG. 1 being indicated with corresponding reference numerals. In this embodiment, the first and second portions 18 and 20 of the health information label 14 may be substantially equal in size and shape. It will be noted that the masking label 28 encompasses substantially all of the second portion 20. Further, it will be noted that the perforation line 34 is substantially larger than the portion 20. As a consequence, when the label 14 is removed from the line 12 and applied to a container surface, the portion 20 and the removable liner piece 36 will simply hang freely from the balance of the label 14, with that portion of the label 14 above perforation line 22 being secured to the surface by permanent adhesive. When it is desired to obscure the association between the name of the patient in area 26 and the health related information in area 24, the label 14 is simply torn along line 22, the portion 20 is removed from the piece 36, and the masking label 28 applied over one or both areas 24 and 26.

Figure 3:
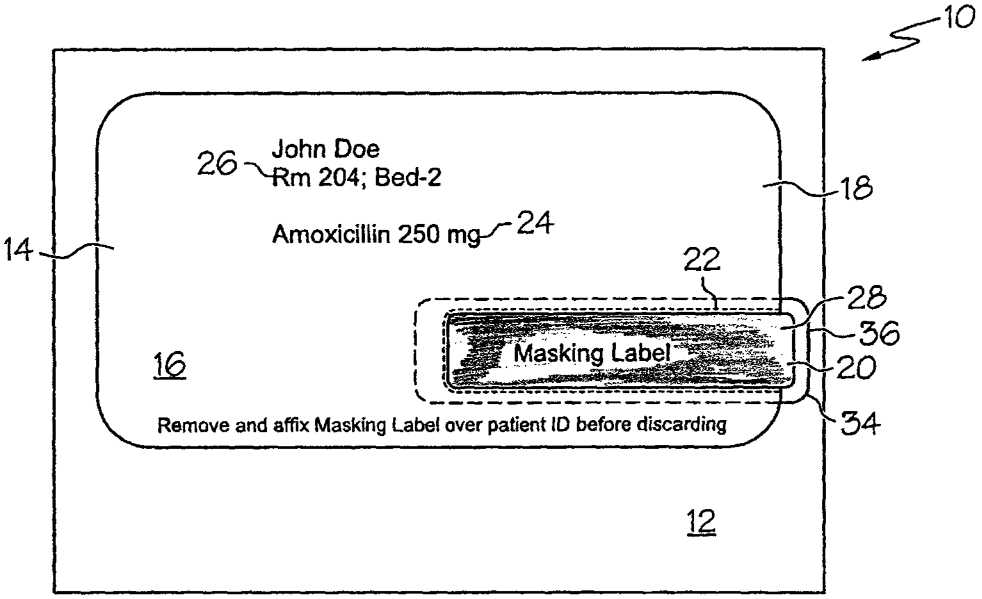
FIG. 3 is plan view of a third embodiment of the present invention.

Reference is made to FIG. 3, which shows a third embodiment of the invention, with elements that correspond to those of the embodiment of FIG. 1 being indicated with corresponding reference numerals. In the embodiment of FIG. 3, the health information label 14 essentially surrounds the masking label 28 on three sides. The masking label 28 is shown as essentially all black; however, the masking label 28 may bear jumbled indicia, opaque materials of some sort, or other blocking means.

Figure 4:
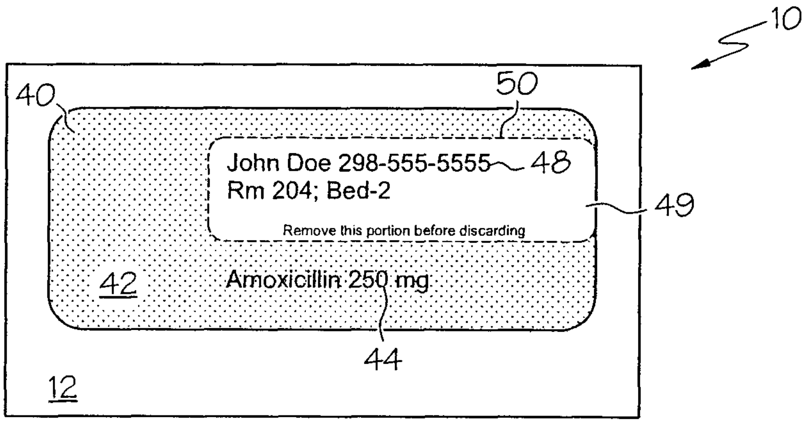
FIG. 4 is a plan view of a fourth embodiment of the present invention.

Reference is made to FIG. 4, which shows a fourth embodiment of the invention, with elements that correspond to those of the embodiment of FIG. 1 being indicated with corresponding reference numerals. The data carrier 10 includes a release liner 12, and a health information label 40 having an upper surface 42 and a lower surface. The health information label 40 includes a first area 44 on the upper surface 46 for indicia specifying health related information (for example, "Amoxicillin 250 mg") and a second area 48 on the upper surface 42 for indicia specifying the identity of a patient (for example, "John Doe"). A pressure sensitive adhesive coating is provided on a portion of the lower surface of the health information label 40, indicated by stippling in FIG. 4. The adhesive secures the health information label 40 to the release liner 12. The lower surface of the health information label 40 beneath area 48 is substantially free of pressure sensitive adhesive. A second label 49, integral with the health information label 40, is defined by a perforation line 50.

In use, the label 40 with integral label 49 is removed from the release liner and secured to a container by the pressure sensitive adhesive. When the container is to be discarded, the label 49 is removed. This effectively disassociates the identity of the patient from the prescription information. The removed label can then be separately destroyed. It will be appreciated that the applied to the arrangement of FIG. 4 can be modified, such that the label 49 encompasses area 44 or both area 44 and area 48. The important thing is that the association between the medication and identity of the patient be eliminated before the labeled container is discarded.

Figure 5:
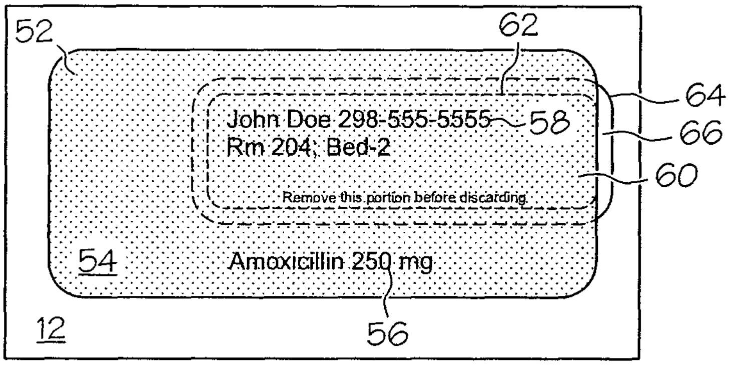
FIG. 5 is a plan view of a fifth embodiment of the present invention.

Reference is made to FIG. 5, which shows a fifth embodiment of the invention, with elements that correspond to those of the embodiment of FIG. 1 being indicated with corresponding reference numerals. The data carrier of FIG. 5 includes a release liner 12, and a health information label 52 having an upper surface 54 and a lower surface. The label 52 includes a first area 56 on the upper surface 54 for indicia specifying health related information and a second area 58 on the upper surface 54 for indicia specifying the identity of a patient. A pressure sensitive adhesive coating on the lower surface of the health information label 52 secures the health information label 52 to the release liner 12. A second label 60 is integral with the health information label 60 and is defined by a perforation line 62 enclosing at least a portion of one of the first and second areas. A die cut 64 in the release liner 12 defines a removable liner piece 66 beneath the second label 60.

In use, the label 52 is applied to the container surface with the removable liner piece held behind the label 52. When the container is to be discarded, the label 60, or the label 60 and liner piece 66 are removed from the container and discarded separately. This obscures the association between the identity of the patient and the health related information. It will be appreciated that in an alternative arrangement, the health information, or that both the identity of the patient and the health information, may be printed on the label 60. In any event, the removal and separate disposal of the label eliminates the association between the patient and the health related information. It will be noted that the second label 60 is smaller than the removable liner piece beneath 66 the second label, and that the removable liner piece 66 extends beyond the edge of the health information label 52 such that the removable liner piece 66 may be used to remove the second label.

Figure 6:
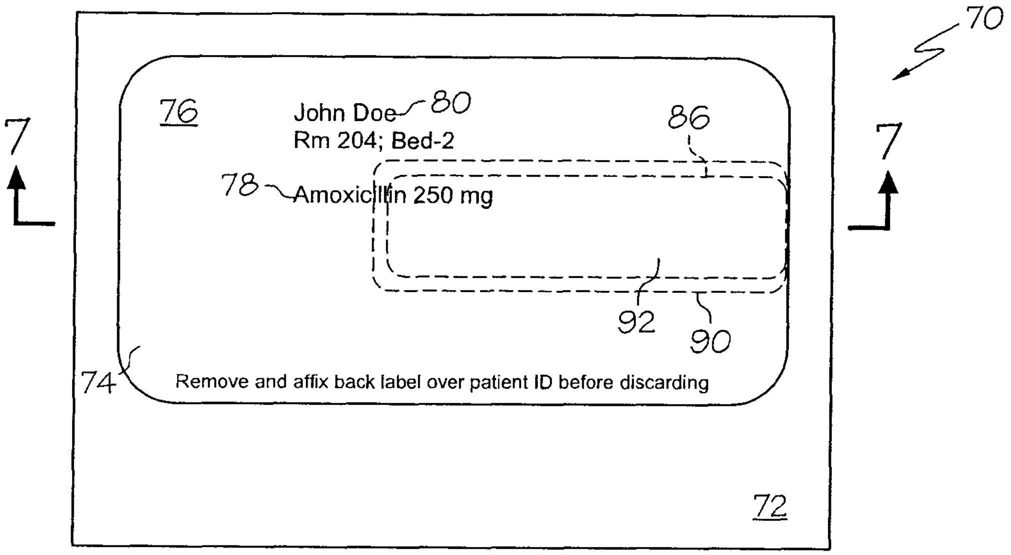
FIG. 6 is a plan view of the front of a sixth embodiment of the present invention.
Figure 7:
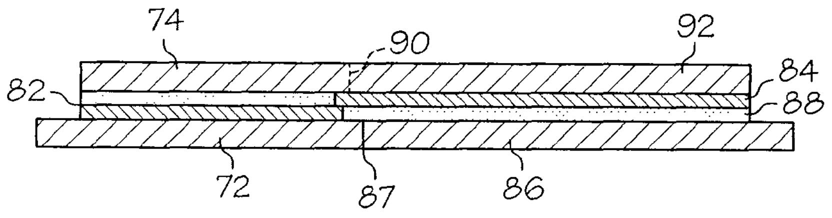
FIG. 7 is a sectional view of the embodiment of FIG. 6, taken generally along line 7-7 in FIG. 6.
Figure 8:
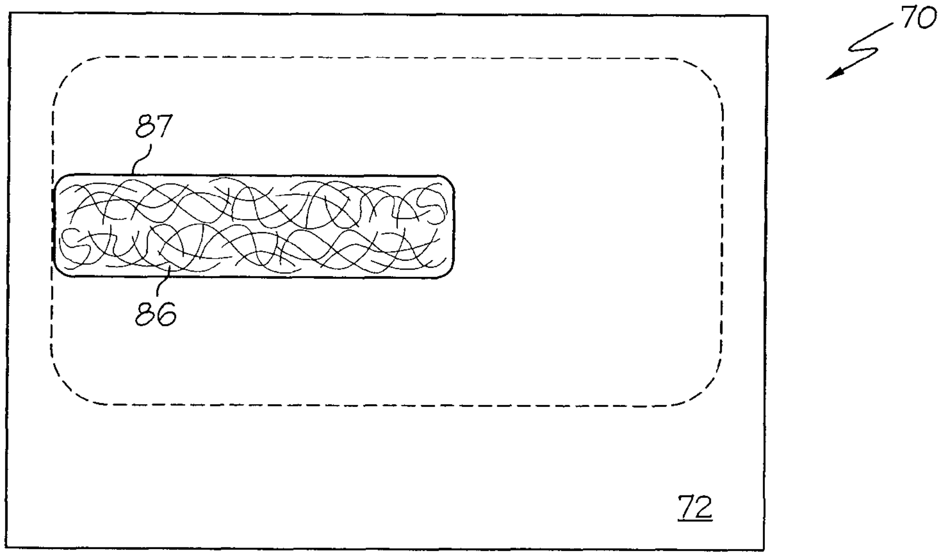
FIG. 8 is a plan view of the back of the embodiment of FIG. 6.

Reference is made to FIGS. 6-8, which show a sixth embodiment of the invention. The thicknesses of the various layers in FIG. 7 are exaggerated for clarity of illustration. The data carrier 70 includes a release liner 72, and a health information label 74 having an upper surface 76 and a lower surface. The label 74 includes a first area 78 on the upper surface 76 for indicia specifying health related information (such as "Amoxicillin 250 mg") and a second area 80 on the upper surface 76 for indicia specifying the identity of a patient (such as "John Doe, Rm 204; Bed-2"). A pressure sensitive adhesive coating 82 on a portion of the lower surface of the health information label 74 secures the health information label 74 to the release liner 72. The balance of the lower surface of the health information label 74 has a release coating 84. A masking label 86 has blockout indicia printed thereon and is defined by a die cut 87 in the liner 72. The masking label 86 carries a pressure sensitive coating 88 and is integral with the release liner 72. The masking label 86 is positioned in alignment with the release coating 84 on the lower surface of the health information label 74. A perf cut 90 in the health information label 74 defines a removable label piece 92. The perf cut 90 generally surrounds the release coating 84 on the lower surface of the health information label 74. The perf cut 90 is positioned slightly inward from the position of the silicone coating to allow tolerance for die cutting.

In use, the label 74 is removed from the release liner with the masking label attached to the label 74. The label 74 is secured to a container. When the container is to be discarded, the masking label 86 and removable label piece 92, are separated from the balance of the label 74. The masking label 86 is then separated from the removable label piece 92. The removable label piece 92 is discarded and the masking label 86 is then secured to the label 74. The masking label 86 is applied over one or both of the first and second areas 78 and 80 to obscure the association between the name of the patient and the health related information when the data carrier is to be discarded.

Having described the present invention in detail and by reference to different embodiments thereof, it will be apparent that certain modifications and variations are possible without departing from the scope of the invention defined in the appended claims.

What is claimed is:

1. A data carrier for providing health related information regarding a patient, and for facilitating compliance with HIPAA by the obscuring the association between the name of the patient and the health related information when the data carrier is to be discarded, comprising:

a release liner, a health information label having an upper surface and a lower surface, said label including a first area on said upper surface for indicia specifying health related information and a second area on said upper surface for indicia specifying the identity of a patient, a pressure sensitive adhesive coating on a portion of said lower surface of said health information label, securing said health information label to said release liner, and a release coating on the balance of said lower surface of said health information label, and a masking label carrying a pressure sensitive coating and being integral with said release liner and positioned in alignment with said release coating on said balance of said lower surface of said health information label, and a die cut in said health information label, defining a removable label piece generally surrounding said release coating on said lower surface of said health information label, said removable label piece being removable with said health information label from said release liner, and remaining therewith when said health information label is applied to a surface, said masking label being removable so that it can be applied over one or both of said first and second areas to obscure the association between said name of said patient and said health related information when the data carrier is to be discarded.

2. The data carrier of claim 1, in which said masking label is defined by a die cut in said release liner.

* * * * *